(12) United States Patent  
Yamamoto

(10) Patent No.: US 8,264,771 B2
(45) Date of Patent: Sep. 11, 2012

(54) TRIPOD-CONNECTING ADAPTER

(75) Inventor: Mitsuo Yamamoto, Yokohama (JP)

(73) Assignee: Nikon Vision Co., Ltd., Tokyo (JP)

( * ) Notice: Subject to any disclaimer, the term of this patent is extended or adjusted under 35 U.S.C. 154(b) by 0 days.

(21) Appl. No.: 13/347,929

(22) Filed: Jan. 11, 2012

(65) Prior Publication Data

US 2012/0105950 A1 May 3, 2012

Related U.S. Application Data

(63) Continuation of application No. 12/917,932, filed on Nov. 2, 2010, now abandoned, which is a continuation of application No. PCT/JP2009/058874, filed on May 1, 2009.

(30) Foreign Application Priority Data

May 14, 2008 (JP) .................. 2008-127370

(51) Int. Cl.
*G02B 23/00* (2006.01)
*F16M 11/04* (2006.01)

(52) U.S. Cl. .................. 359/409; 248/187.1
(58) Field of Classification Search .......... 359/409; 248/187.1
See application file for complete search history.

(56) References Cited

U.S. PATENT DOCUMENTS

| 4,557,451 | A | 12/1985 | Conway |
| 5,437,427 | A | 8/1995 | Johnson |
| 5,930,036 | A | 7/1999 | Cluff |
| 6,460,815 | B1 | 10/2002 | Thaler |
| 6,540,185 | B2 | 4/2003 | Ishikawa et al. |
| 2008/0156948 | A1 | 7/2008 | Cameron et al. |

FOREIGN PATENT DOCUMENTS

| JP | 61-176518 U | 11/1986 |
| JP | 2002-072104 A | 3/2002 |

OTHER PUBLICATIONS

International Application No. PCT/JP2009/058874—English translation of the International Preliminary Report on Patentability, dated Jan. 20, 2011, including the Written Opinion of the International Searching Authority.
British Application No. GB1018801.9—Examination Report under Section 18(3) dated May 25, 2011.
British Application No. GB1018801.9—Examination Report under Section 18(3) dated Nov. 16, 2011.

*Primary Examiner* — Alessandro Amari
(74) *Attorney, Agent, or Firm* — Miles & Stockbridge P.C.

(57) ABSTRACT

A tripod-connecting adapter for connecting a pair of binoculars to a tripod comprising: a base portion that has a width in which a left and a right lens barrels of the pair of binoculars to be placed thereon come into contact therewith, and restricts rotation of the pair of binoculars around a joint shaft that connects the pair of lens barrels of the pair of binoculars; and a holding device that is provided on the base portion and is connected to the joint shaft to support the pair of lens barrels so that said pair of lens barrels may be placed on an upper surface of the base portion to come in contact therewith, and restricts movement of the pair of binoculars in an optical axis direction of the pair of binoculars.

21 Claims, 5 Drawing Sheets

TRIPOD-CONNECTING ADAPTER

CROSS-REFERENCE TO RELATED APPLICATIONS

This application is a continuation of application Ser. No. 12/917,932 filed Nov. 2, 2010 now abandoned, which is a continuation of International Application No. PCT/JP2009/058874 filed May 1, 2009.

TECHNICAL FIELD

The present invention relates to a tripod-connecting adapter for connecting a pair of binoculars to a tripod.

BACKGROUND ART

In a conventional tripod-connecting adapter for connecting a pair of binoculars to a tripod, there has been proposed a one including an adapter body on which a through hole is formed, a screw member that is rotatably inserted into the through hole and whose tip portion is connected to a mechanical axis (a joint shaft) of the pair of binoculars, and a friction-force-generation member that is disposed on the adapter body and has given friction force upon connecting the screw member to the mechanical axis (see, for example, Japanese Patent Application Laid-Open No. 2002-072104).

When a pair of binoculars is connected to a tripod by using a conventional tripod-connecting adapter, and when a digital camera, which is a heavy load, is connected to an eyepiece portion of the pair of binoculars, the whole of the binoculars tilts from a horizontal position around the joint shaft or an interpupillary distance of the binoculars varies by the weight of the digital camera or pressure upon releasing the digital camera.

DISCLOSURE OF THE INVENTION

In order to solve the problem, the present invention provides a tripod-connecting adapter for connecting a pair of binoculars to a tripod comprising: a base portion that has a width in which a left and a right lens barrels of the pair of binoculars to be placed thereon come into contact therewith, and restricts rotation of the pair of binoculars around a joint shaft that connects the pair of lens barrels of the pair of binoculars; and a holding device that is provided on the base portion and is connected to the joint shaft to support the pair of lens barrels so that said pair of lens barrels may be placed on an upper surface of the base portion to come in contact therewith, and restricts movement of the pair of binoculars in an optical axis direction of the pair of binoculars.

The present invention makes it possible to provide a tripod-connecting adapter capable of effectively suppressing inclination of a pair of binoculars from a horizontal position around a joint shaft and variation in an interpupillary distance of the pair of binoculars.

EMBODIMENT FOR CARRYING OUT THE INVENTION

A preferred embodiment of the present invention is explained below with reference to accompanying drawings.

Figure 1:
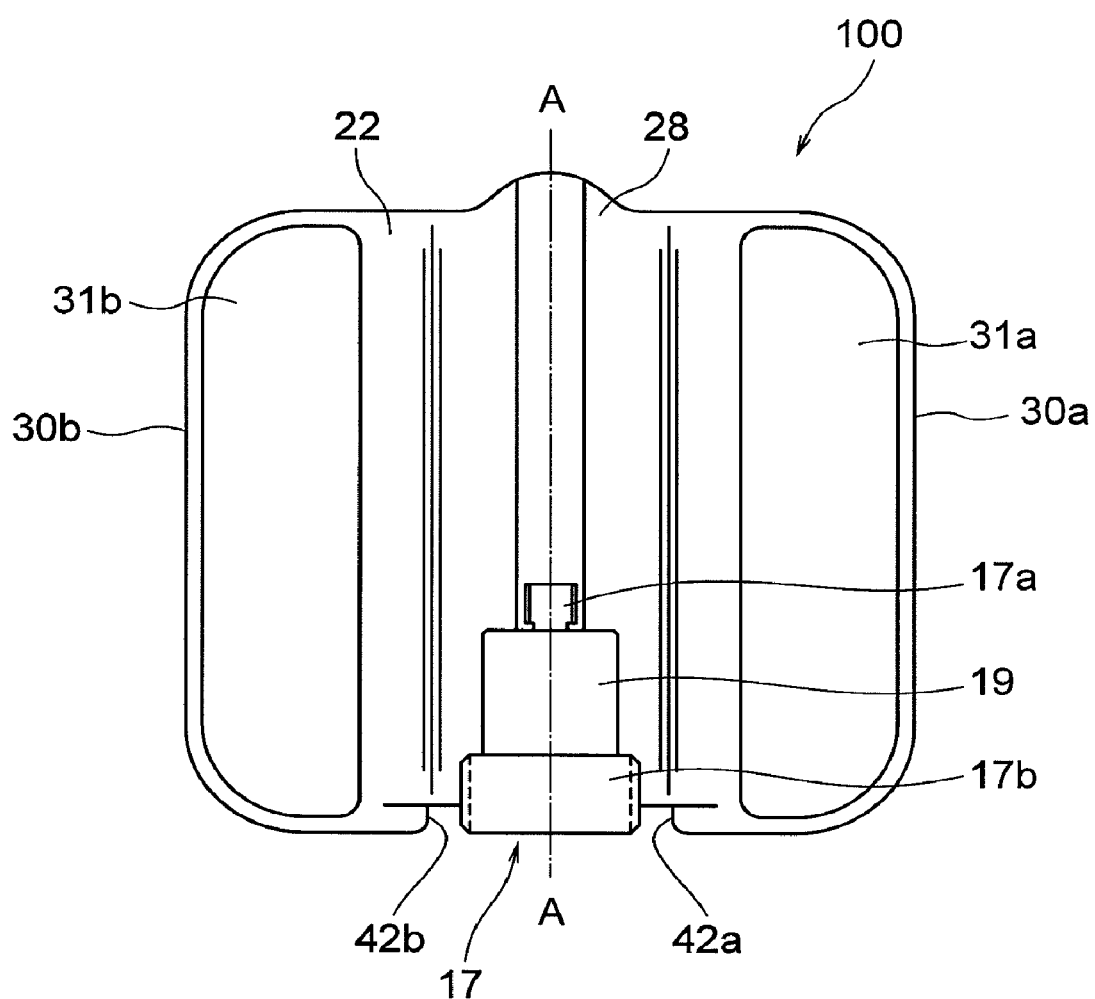
FIG. 1 is a plan view showing a tripod-connecting adapter according to the present invention.
Figure 2:
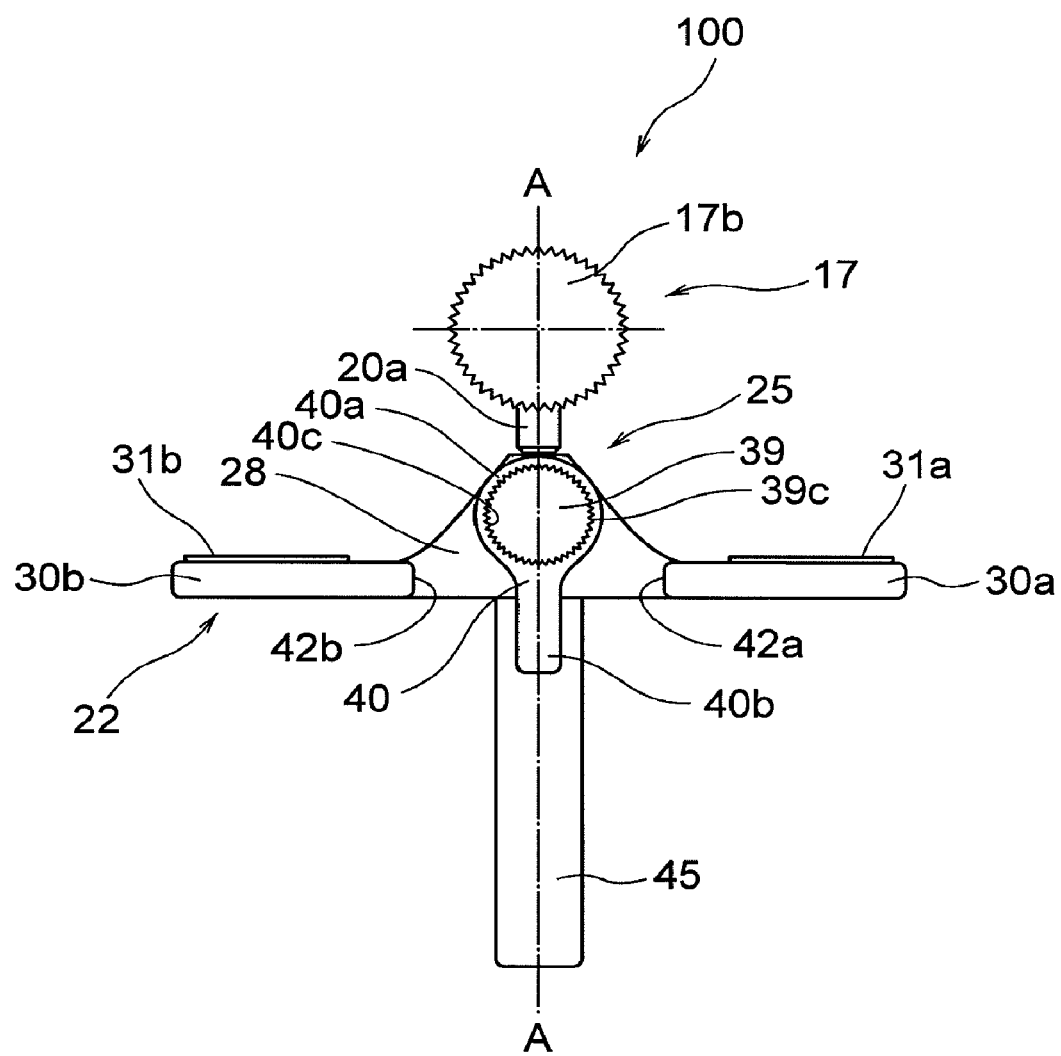
FIG. 2 is a front view showing a tripod-connecting adapter according to the present invention.
Figure 3:
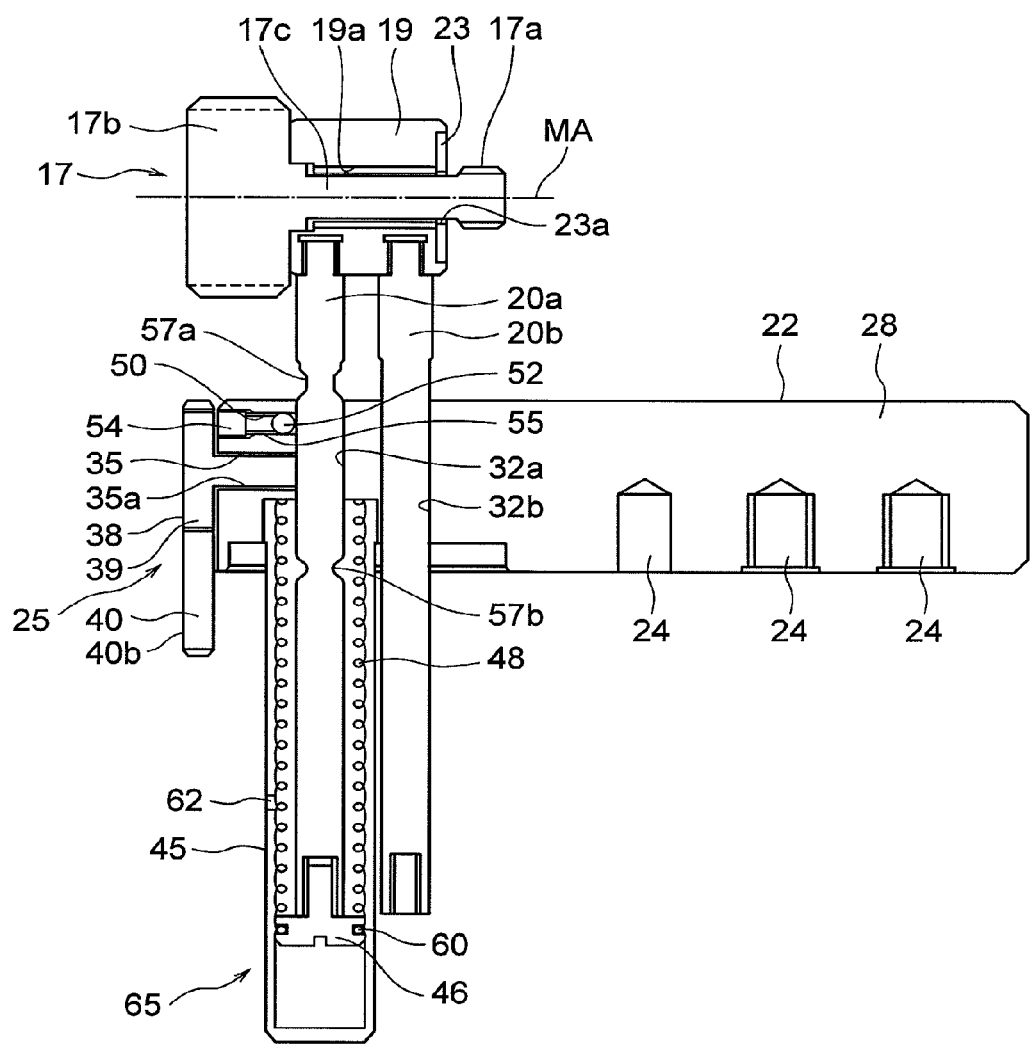
FIG. 3 is a sectional view sectioned along A-A line in FIGS. 1 and 2.

FIG. 1 is a plan view showing a tripod-connecting adapter according to the present invention. FIG. 2 is a front view showing a tripod-connecting adapter according to the present invention. FIG. 3 is a sectional view sectioned along A-A line in FIGS. 1 and 2.

Figure 4:
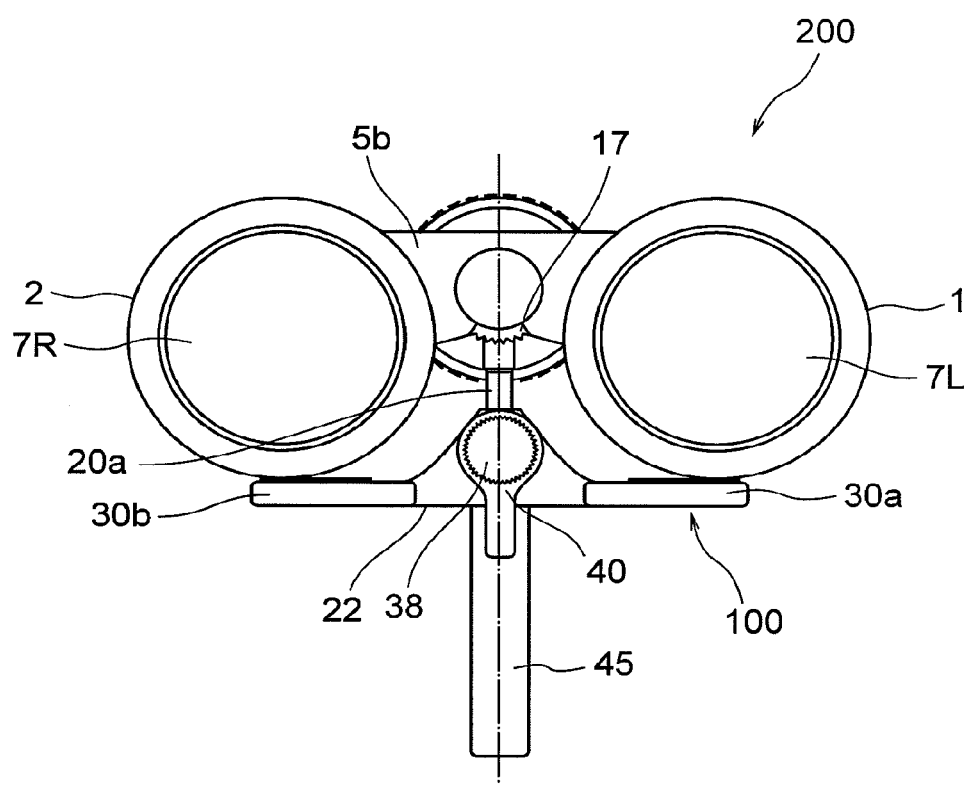
FIG. 4 is a front view upon connecting the tripod-connecting adapter according to the present invention to a pair of binoculars.
Figure 5:
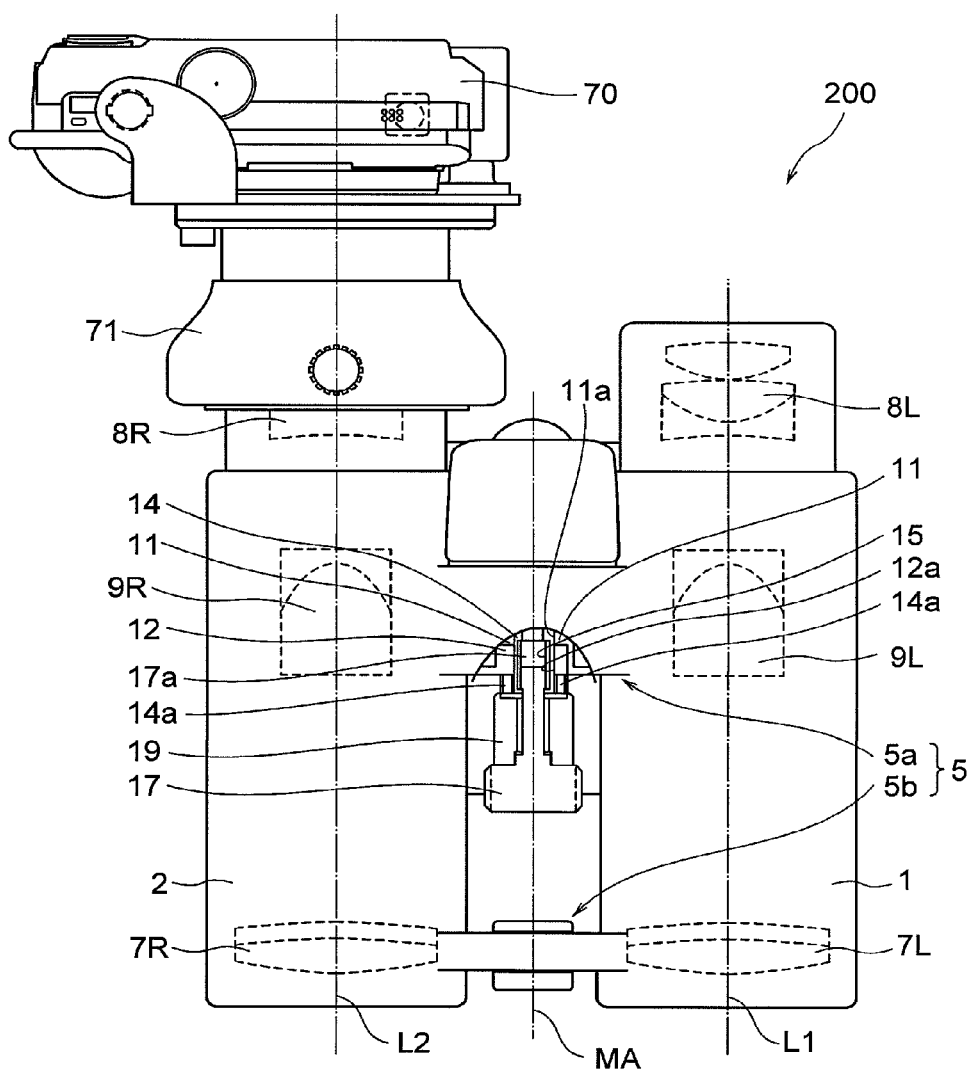
FIG. 5 is a plan view showing a state where a tripod-connecting adapter according to the present invention is connected to a pair of binoculars, and a digital camera is connected to an eyepiece portion of the binoculars through a camera adapter.

FIG. 4 is a front view upon connecting the tripod-connecting adapter according to the present invention to a pair of binoculars. FIG. 5 is a plan view showing a state where a tripod-connecting adapter according to the present invention is connected to a pair of binoculars, and a digital camera is connected to an eyepiece portion of the binoculars through a camera adapter.

Incidentally, in the present specification, up and down direction indicates in a state when a pair of binoculars is held horizontally in an ordinary manner, and left and right direction indicates in a state that is seen from an eyepiece position when a pair of binoculars is held horizontally in an ordinary manner.

In FIGS. 1 and 5, upper side of the drawing is an eyepiece side, lower side of the drawing is an objective lens side, the depth side of the drawing is a lower direction, and the near side of the drawing is an upper direction. In FIGS. 2 and 4, the depth side of the drawing is an eyepiece side, the near side of the drawing is an objective lens side, the upper side of the drawing is an upper direction, and the lower side of the drawing is a lower direction. In FIG. 3, the right side of the drawing is an eyepiece side, the left side of the drawing is an objective lens side, the upper side of the drawing is an upper direction, and the lower side of the drawing is a lower direction.

As shown in FIG. 5, a pair of binoculars 200 used in the present embodiment is equipped with, as seen from an eyepiece side, a pair of lens barrels of a left lens barrel 1 and a right lens barrel 2, and a bridge portion 5 that connects lens barrels 1 and 2 parallel. In the lens barrel 1, there are provided an objective lens 7L and an eyepiece 8L, and an erecting prism 9L is disposed on an optical path between the objective lens 7L and the eyepiece 8L. A left telescopic optical system is composed of the objective lens 7L, the eyepiece 8L, and the erecting prism 9L. Moreover, in the lens barrel 2, there are provided an objective lens 7R and an eyepiece 8R, and an erecting prism 9R is disposed on an optical path between the objective lens 7R and the eyepiece 8R. A right telescopic optical system is composed of the objective lens 7R, the eyepiece 8R, and the erecting prism 9R. The bridge portion 5 connects lens barrels 1 and 2 at two portions of an objective lens side portion and an eyepiece side portion.

An eyepiece side bridge portion 5a connects lens barrels 1 and 2 at the eyepiece 8L, 8R side in the optical axis L1, L2 direction. The bridge portion 5a is composed of an arm portion 11 provided in a body with the lens barrel 1 in the vicinity of the erecting prism 9L, an arm portion 12 provided in a body with the lens barrel 2 in the vicinity of the erecting prism 9R, and a joint shaft 14 that has a cylindrical shape and becomes a central axis member of the joint mechanism connecting these arm portions 11 and 12 to form a joint mechanism. A hole 11a is provided on the arm portion 11 in the optical axis direction, and a hole 12a is provided on the arm portion 12 in the optical axis direction. The hole 11a of the arm portion 11 and the hole 12a of the arm portion 12 are disposed coaxially in the optical axis direction, and the joint shaft 14 is inserted into these holes 11a and 12a. The joint shaft 14 is fitted into the holes 11a and 12a, holds one arm portion 11 rotatable around the joint shaft 14, and holds the other arm portion 12 non-rotatable around the joint shaft 14. In this manner, the arm portions 11 and 12 are connected in a relatively rotatable manner around the axis MA through the joint shaft 14 in order to adjust an interpupillary distance at the center of the lens barrels 11 and 12. Incidentally, the axis MA and the optical axes L1 and L2 of the telescopic optical systems are parallel.

At an outer circumferential side of the joint shaft 14, an unillustrated washer is disposed between the arm portions 11 and 12. An unillustrated annular portion that protrudes radially from the joint shaft 14 is formed at the eyepiece side 8L and 8R of the outer circumference of the joint shaft 14. On the other hand, an unillustrated male screw is formed at the objective lens 7L, 7R side of the outer circumference of the joint shaft 14. With clamping a nut 14a on the male screw from the objective lens 7L, 7R side, the arm portions 11 and 12 are tightened in the optical axis L1, L2 direction by the annular portion and the nut 14a with the unillustrated washer in between, so that friction force is generated between the arm portions and the washer. The magnitude of the friction force is such that an arbitrary angle formed by the lens barrels 1 and 2 can be secured with overcoming the weight of the lens barrels 1 and 2, and the lens barrels 1 and 2 can be relatively rotated around the axis MA with applying given external force.

In this manner, the eyepiece side bridge portion 5a has a joint mechanism composed of the joint shaft 14, arm portions 11 and 12, and the unillustrated washer, and makes the lens barrels 1 and 2 relatively bendable in an arbitrary angle around the axis MA.

An objective lens side bridge portion 5b also has a joint mechanism composed of similar arm portions and a joint shaft.

Accordingly, an interpupillary distance of the pair of binoculars 200 can be adjusted by relatively rotating the lens barrels 1 and 2 around the axis MA.

A screw for connecting a tripod-connecting adapter 100 explained later in detail is provided on an inner circumference of the joint shaft 14. The screw for connecting the tripod-connecting adapter 100 is a female screw 15 formed on the objective lens 7L, 7R side inner circumference of the joint shaft 14, and formed coaxially with the axis MA. When the tripod-connecting adapter 100 is not used, an unillustrated cap is attached to the female screw 15.

FIGS. 1 through 3 are a plan view, a front view, and a sectional view sectioned along A-A line in FIGS. 1 and 2, respectively, of the tripod-connecting adapter (hereinafter simply called as an adapter) 100.

As shown in FIG. 3, the adapter 100 is composed of an operating portion 17 on which a screw portion 17a that connects the pair of binoculars 200 to the adapter 100 is formed, a hold member 19 which holds the operating portion 17 and in which a column portion 17c of the operating portion 17 is inserted, a base portion 22 through which the hold member 19 is inserted movably in up and down direction in FIG. 3 and on which the pair of binoculars 200 is to be placed, screw portions 24 that are formed on the base portion 22 for connecting to a tripod, and a clamp mechanism 25 that is engaged with the hold member 19 to adjust a relative position in up and down direction between the base portion 22 and the operating portion 17.

Incidentally, a portion of the hold member 19 is provided with two guide bars 20a and 20b that are integrally connected and disposed under the operating portion 17. In the hold member 19, portions that are inserted into the base portion 22 are the guide bars 20a and 20b.

As shown in FIG. 3, the operating portion 17 is composed of a knob 17b that is disposed at the objective lens side of the guide bars 20a and 20b for rotating operation, the column portion 17c that extends from the center of the knob 17b toward the eyepiece 8L, 8R side in the optical axis direction of the pair of binoculars 200 (hereinafter called as an optical axis direction) upon connecting the binoculars 200 to the adapter 100, and the screw portion 17a that is formed on an end portion of the column portion 17c. On the hold member 19, a hole 19a in which the column portion 17c of the operating portion 17 is inserted is formed, and on the eyepiece 8L, 8R side thereof, an elastic plate member 23 formed by an elastic material such as rubber is provided. A hole 23a is formed on the elastic plate member 23 at a position corresponding to the hole 19a of the hold member 19, and the diameter of the hole 23a of the elastic plate member 23 is formed smaller than the diameter of the screw portion 17a of the operating portion 17.

The column portion 17c of the operating portion 17 is inserted from the objective lens 7L, 7R side of the hold member 19 into the hole 19a of the hold member 19. The column portion 17c of the operating portion 17 passes through the hole 23a of the elastic plate member 23, and the screw portion 17a is protruded outward from the elastic plate member 23 which is the tip portion of the hold member 19, and the hold member 19 is disposed to the outer circumferential side of the column portion 17c. With this construction, the operating portion 17 is held by the hold member 19, and the elastic plate member 23 becomes a retainer of the screw portion 17a of the operating portion 17 from the objective lens 7 side.

The screw portion 17a of the operating portion 17 is screwed into the female screw 15 formed on the inner circumference of the joint shaft 14 of the pair of binoculars 200 (see FIG. 5) to connect the binoculars 200 to the adapter 100. With connected to the operating portion 17, the pair of binoculars 200 is restricted movement in the optical axis L1, L2 direction.

In the present embodiment, two guide bars 20a and 20b, which are portions of the hold member 19, are round bars each having a circular section, and provided along the optical axis.

As shown in FIGS. 3 and 4, the operating portion 17 and the hold member 19 are held at the lower position by the base portion 22 on which the pair of binoculars 200 is placed. In the present embodiment, as shown in FIG. 1, the base portion 22 has substantially a rectangular shape having a width where left and right lens barrels of the binoculars come into contact with. Moreover, as shown in FIG. 2, in the upper surface thereof, the center portion in right and left direction (right and left direction in FIG. 2) extends in the optical axis L1, L2 direction, and forms a thick portion 28. In other words, the base portion 22 is composed of the thick portion 28 that extends in the optical axis L1, L2 direction, a left plate portion 30a on which the left lens barrel 1 of the pair of binoculars 200 is placed, and a right plate portion 30b on which the right lens barrel 2 of the pair of binoculars 200 is placed, each extending in left or right direction from left or right side of the thick portion 28. Nonskid members 31a and 31b, which come in contact with the left and right lens barrels of the binoculars 200, are stuck on the upper surfaces of left and right plate portions 30a and 30b, respectively, in order to prevent the position of the binoculars 200 placed on the surfaces from shifting. Moreover, as shown in FIG. 3, screw portions 24 for connecting a tripod are provided under the thick portion 28. With providing screw portions 24 there, it becomes possible to widen the contact area to the tripod, so that the adapter can be stably fixed to a tripod.

With placing the binoculars 200 on the base portion 22, the lens barrels 1 and 2 are restricted from rotating around the joint shaft 14 (axis MA), the interpupillary distance of the binoculars 200 is prevented from varying, and horizontality of the binoculars can be secured.

Holes 32a and 32b in which guide bars 20a and 20b are inserted are provided up and down direction in the vicinity of the objective lens 7L, 7R side end of the thick portion 28 of the base portion 22 (see FIG. 3). In the present embodiment, since two guide bars 20a and 20b are provided on the hold member 19, two holes 32a and 32b corresponding to the positions of the guide bars 20a and 20b are provided on the thick portion 28. With the guide bars 20a and 20b being inserted into the holes 32a and 32b on the thick portion 28, the base portion 22 and guide bars 20a and 20b can be relatively movable in up and down direction.

In the present embodiment, the reason why the two guide bars 20a and 20b are provided on the hold member 19 is as follows. In the present embodiment, since each guide bar 20a, 20b adopts a round bar having a circular cross section, when only one guide bar 20a is used, there is a risk that the hold member 19 connected to the guide bar 20a may be turned around the guide bar 20a. Then, another guide bar 20b is provided on the hold member 19, and with inserting the guide bar 20b also into the base portion 22, the hold member 19 and the operating portion 17 held by the hold member 19 are prevented from rotating around the guide bar 20a.

On the objective lens 7L, 7R side end of the thick portion 28 of the base portion 22, a fixing means for fixing a relative position in the up and down direction between the guide bars 20a, 20b and the base portion 22 is provided. A hole 35 extending in the optical axis L1, L2 direction is provided on the objective lens 7L, 7R side end of the thick portion 28 of the base portion 22, and the hole 35 in the optical axis direction is communicated with the hole 32a at the objective lens 7L, 7R side among two holes 32a and 32b in which the guide bars 20a and 20b are inserted. A female screw 35a is formed on the inner circumference of the optical axis L1, L2 direction hole 35, and a clamp screw 38 is screwed therein from the objective lens 7L, 7R side. The clamp screw 38 is screwed in until a tip thereof comes into contact with the guide bar 20a inserted into the up and down direction hole 32a of the base portion 22. With the clamp screw 38 coming in contact with the guide bar 20a, movement in up and down direction of the guide bar 20a is restricted, and the guide bar 20a is fixed. In this manner, the fixing means for fixing a relative position in the up and down direction between the guide bar 20a and the base portion 22 is the clamp mechanism 25 using the clamp screw 38.

As shown in FIGS. 2 and 3, a clamp-operating portion 40 is attached on the outer circumferential side of a disk-shaped head portion 39 of the clamp screw 38. As shown in FIG. 2, the clamp-operating portion 40 is composed of an annular portion 40a, and a lever portion 40b protruding radially from the annular portion 40a. A female serration 40c is formed on the inner circumference of the annular portion 40a, and meshed with a male serration 39c formed on the outer circumference of the head portion 39 of the clamp screw 38. The clamp-operating portion 40 is removably attached to the head portion 39 of the clamp screw 38 by the serration mechanism.

The clamp-operating portion 40 is attached to the head portion 39 of the clamp screw 38 with the lever 40b coming lower side. The objective lens 7L, 7R side ends of the left and right plate portions 30a and 30b of the base portion 22 are protruding in the optical axis L1, L2 direction to the objective lens 7L, 7R side more than the objective lens 7L, 7R side end of the thick portion 28 (see FIG. 1). In other words, a left step portion 42a having a step in the optical axis L1, L2 direction between the end of the thick portion 28 and the end of the left plate portion 30a and a right step portion 42b having a step in the optical axis L1, L2 direction between the end of the thick portion 28 and the end of the right plate portion 30b are respectively formed (see FIGS. 1 and 2). When the clamp screw 38 is rotated in tightening direction or in loosening direction upon attaching the clamp-operating portion 40 to the clamp screw 38, the side surface of the lever portion 40b positioned in lower side hits the left or right step portion 42a or 42b of the base portion 22, so that the clamp-operating portion 40 does not rotate any more. In other words, the lever portion 40b of the clamp-operating portion 40 has a sufficient length to hit the left or right step portion 42a or 42b, in other words, the end portion of the left or right plate portion 30a or 30b upon rotating the lever portion 40b, so that a distance between the left and right step portions 42a and 42b is a certain width capable of restricting rotation of the lever 40b within a given range. With the restricting construction of the operating range, rotation range of the clamp screw 38 is restricted within a given range, so that coming out of the clamp screw 38 is prevented.

As shown in FIG. 3, in one (the objective lens side guide bar 20a in the present embodiment) of the two guide bars 20a and 20b inserted into the thick portion 28 of the base portion 22, a portion that passes through the base portion 22 to protrude downward is inserted into a case 45 provided integrally with the thick portion 28 of the base portion 22. The inner diameter of the case 45 is formed larger than the diameter of the guide bar 20a. A screw 46 is attached on the lower end of the guide bar 20a, and the diameter of the head of the screw 46 is larger than the diameter of the guide bar 20a, and smaller than the inner diameter of the case 45. A compression spring 48 is inserted on the outer circumferential side of the guide bar 20a that is on the inner circumferential side of the case 45. An end portion of the compression spring 48 is touched to the lower surface of the base portion 22, and the other end portion is touched to the head of the screw 46. With this construction, the guide bar 20a is biased downward by elasticity of the compression spring 48. With this bias force, the pair of binoculars 200 connected to the screw portion 17a of the operating portion 17 is biased toward the base portion 22, in other words, in a direction that a distance between the operating portion 17 and the base portion 22 becomes narrow, and fixed with being pressed to the base portion 22.

Upon operating the adapter 100, when the clamp screw 38 is loosened, the distance between the operating portion 17 and the base portion 22 is suddenly narrowed by the bias force of the guide bar 20a toward the base portion 22 caused by the compression spring 48. However, in the present embodiment, a safety measure for preventing a finger of an operator from getting caught between the operating portion 17 and the base portion 22 is provided. In other words, a resisting means for resisting the bias force to the guide bar 20a is provided. The construction is explained below.

A hole 50 extending in the optical axis L1, L2 direction is provided on the objective lens 7L, 7R side end of the thick portion 28 of the base portion 22, and the hole 50 is interconnected with the hole 32a, extending in the up and down direction, in which the guide bar 20a is inserted. A ball 52 is inserted in the hole 50, and a compression spring 55 is inserted between the ball 52 and a screw 54 that blocks the hole 50 from the end side. The ball 52 is biased toward the side surface of the guide bar 20a by elasticity of the compression spring 55. A groove is provided at a given position of a middle position in the up and down direction of the guide bar 20a. The position where the groove is provided is a position where the resistance force overcoming bias force of the guide bar 20a toward the base portion 22 caused by the compression spring 48 is to be applied. In the present embodiment, two grooves 57a and 57b are provided on the guide bar 20a. The lower side groove 57b is provided in the vicinity of the center of the guide bar 20a, and the upper side groove 57a is provided at a position near to the operating portion 17.

Upon removing the pair of binoculars 200 from the adapter 100, when the clamp screw 38 is loosened, the guide bar 20a is moved downward by elasticity of the compression spring 48. In this instance, the ball 52 biased toward the side surface of the guide bar 20a by the compression spring 55 is fallen in the lower groove 57b or the upper groove 57a by the downward movement of the guide bar 20a. Accordingly, the downward moving speed of the guide bar 20a is reduced or the downward movement is stopped, so that even if a finger of an operator is there between the operating portion 17 and the base portion 22, it becomes possible to prevent the finger from getting tightly caught by the operating portion 17. In the present embodiment, two grooves 57a and 57b are provided, so that even if the movement of the guide bar 20a is stopped when the ball 52 is fallen into the upper groove 57a, a sufficient space for keeping a finger is secured between the operating portion 17 and the base portion 22. When a groove is provided in such a manner that the guide bar 20a stops at a position where a sufficient space for keeping a finger can be secured between the operating portion 17 and the base portion 22, the groove may be one.

In the present embodiment, other than the above-described mechanism composed of the ball 52 and grooves 57a, and 57b, the downward bias force of the guide bar 20a is also resisted by an air damper mechanism 65. The air damper mechanism 65 is explained below.

An O-ring 60 is attached to the head of the screw 46 connected to the lower end of the guide bar 20a, and the O-ring 60 is slid on the inner circumference of the case 45. On the other hand, the lower end of the case 45 is shielded, and an air hole 62 that is communicated with the outer space is formed on a given position of the side surface of the case 45. The position where the air hole 62 is provided is a position where a sufficient space for keeping a finger between the operating portion 17 and the base portion 22 can be secured upon moving the guide bar 20a downward by the compression spring 48. Moreover, the screw 46 is located upper than the air hole 62 upon connecting the pair of binoculars 200 to the adapter 100.

Upon removing the pair of binoculars 200 from the adapter 100, when the clamp screw 38 is loosened, the guide bar 20a is moved downward by elasticity of the compression spring 48. In this instance, the air in the case 45 is gradually leaked through the air hole 62 as the movement of the guide bar 20a, so that the screw 46 attached to the guide bar 20a is moved downward together with the guide bar 20a until the position where the air hole 62 is provided. However, the case 45 becomes airtight by the screw 46 and the lower portion of the case 45 lower than the position where the air hole 62 is provided, so that the guide bar 20a does not move lower than the position. Accordingly, the downward movement of the guide bar 20a is stopped, and the distance between the operating portion 17 and the base portion 22 does not narrowed any more, so that an injury caused by jamming a finger can be prevented.

In the present embodiment, as a mechanism for preventing a finger from jamming by large energy, although there are provided a mechanism of a combination of the ball 52 and grooves 57a and 57b, and the air damper mechanism 65, an injury caused by jamming a finger can be prevented by providing any one of these mechanisms.

Then, how to use the adapter 100 is explained. Incidentally, the interpupillary distance is assumed to have already been adjusted.

At first, the guide bars 20a and 20b are pulled upward by pulling the hold member 19 upward. By making rotating operation of the knob 17b of the operating portion 17 of the adapter 100, the screw portion 17a of the operating portion 17 is meshed with, and screwed into the female screw 15, which is for connecting with the adapter and is provided on the joint shaft 14 of the pair of binoculars 200, so that the adapter 100 is connected to the pair of binoculars 200. In this state, the operating portion 17, the hold member 19 and the pair of binoculars 200 become in a body. Accordingly, the pair of binoculars 200 can be moved in up and down direction together with the guide bars 20a and 20b connected to the hold member 19.

As shown in FIG. 4, in order to stabilize the pair of binoculars 200, the guide bars 20a and 20b are moved downward until the left and right lens barrels 1 and 2 of the binoculars 200 come into contact with the left and right plate portions 30a and 30b of the base portion 22. There are various shapes of the lens barrels from the objective lens 7L, 7R side to the eyepiece 8L, 8R side such as a cylindrical shape parallel to the optical axis L1, L2, and a tapered shape having inclination from the objective lens 7L, 7R side to the eyepiece 8L, 8R side. In a case of a pair of binoculars having the lower side shapes of the lens barrels parallel to the optical axes L1, L2, the lower side of the lens barrels come into contact with the nonskid members 31a, 31b of the plate portions 30a, 30b from the objective lens 7L, 7R side to the eyepiece 8L, 8R side. On the other hands, in a case of a pair of binoculars having lens barrels with tapered shapes having larger diameters in the objective lens 7L, 7R side than those in the eyepiece 8L, 8R side, the eyepiece 8L, 8R side lower portions of the lens barrels do not come into contact with the nonskid members 31a, 31b, and the objective lens 7L, 7R side lower portions come into contact with the nonskid members 31a, 31b. In this case, when the shapes of the nonskid members 31a, 31b are made to have shapes corresponding to the tapered shapes of the lens barrels, the lower portions of the lens barrels can come into contact with the nonskid members from the objective lens 7L, 7R side to the eyepiece 8L, 8R side 31a, 31b, so that the pair of binoculars can be further stabilized. In this manner, the nonskid members 31a, 31b of the plate portions 30a, 30b may be varied corresponding to the shapes of the lens barrels of the pair of binoculars.

Since the guide bar 20a is biased downward by elasticity of the compression spring 48, the pair of binoculars 200 is pressed to the base portion 22 to be stabilized. When the pair of binoculars 200 is stabilized to the base portion 22, the clamp screw 38 is screwed until the tip portion of the clamp screw 38 comes into contact with the guide bar 20a. With this state, the relative position in up and down direction between the guide bar 20a and the base portion 22 is fixed, the position between the base portion 22 and the female screw 15 for connecting the adapter to the binoculars 200 can be invariable, so that the pair of binoculars 200 is fixed to the adapter 100.

When the clamp screw 38 is screwed until the clamp screw 38 comes into contact with the guide bar 20a, the clamp-operating portion 40 is connected to the head portion 39 of the clamp screw 38 with the lever 40b coming lower side. In this state, when the clamp-operating portion 40 is turned to make the clamp screw 38 strongly contact with the guide bar 20a, the position of the guide bar 20a does not change, so that the pair of binoculars 200 does not move in up and down direction. Since rotation of the clamp-operating portion 40 is restricted in a given range by the step portions 42a and 42b formed on the objective lens 7L, 7R side of the base portion 22, even if clamp operation or clamp release operation is carried out by the clamp-operating portion 40, the clamp screw 38 does not rotate more than the given range, so that clamp screw does not come off.

In this manner, the movement of the pair of binoculars 200 in the optical axis L1, L2 direction is restricted by the operating portion 17, and the rotation of the lens barrel 1, 2 around the axis MA is restricted by the base portion 22, so that the pair of binoculars 200 is fixed to the adapter 100 with a stable posture.

FIG. 5 is a plan view showing a state where a digital camera 70 is connected to one lens barrel 2 of the pair of binoculars 200 that is connected to the tripod-connecting adapter 100 in this manner.

On the eyepiece 8R side of the one lens barrel 2 the digital camera 70 is connected through a camera adapter 71. When a heavy object such as the digital camera 70 is connected to the one lens barrel 2, downward force, in other words, force in shortening the interpupillary distance around the axis MA is applied to the one lens barrel 2 by the weight of the digital camera 70. In case of the adapter 100 according to the present invention, since the lens barrels 1 and 2 are fixed to the base portion 22, even if the weight is applied to the one lens barrel 2, the lens barrel 2 does not rotate around the axis MA. As a result, the horizontal position of the binoculars 200 can be maintained, and the interpupillary distance does not change.

Moreover, even if pressure to release the shutter release button of the digital camera 70 is applied, similarly the lens barrels 1 and 2 do not rotate around the axis MA, and the horizontal position of the binoculars 200 can be maintained, and the interpupillary distance does not change.

When the pair of binoculars 200 is removed from the adapter 100, at first, the clamp-operating portion 40 is rotated in loosening direction of the clamp screw 38. Then, the clamp-operating portion 40 is removed from the head portion 39 of the clamp screw 38, and the clamp screw 38 is further loosened. The contact between the tip portion of the clamp screw 38 and the guide bar 20a is released, and the guide bars 20a and 20b can be moved in the up and down direction. Then, the pair of binoculars 200 is lifted upward together with the guide bars 20a and 20b, and the knob 17b of the operating portion 17 is rotated to release connection between the knob 17b of the operating portion 17 and the female screw 15 of the joint shaft 14 of the binoculars 200. In this manner, the pair of binoculars 200 can be removed from the adapter 100.

The operating portion 17 where the pair of binoculars 200 have been removed from is drawn by elasticity of the compression spring 48 toward the base portion 22 together with the guide bar 20a. In this instance, even if a finger of the operator is there between the operating portion 17 and the base portion 22, the guide bar 20a is stopped at a given position by engagement between the groove 57a or 57b of the guide bar 20a and the ball 52, or by the air damper mechanism 65, so that an injure of the finger getting caught between the operating portion 17 and the base portion 22 can be prevented.

Although the explanation of the present embodiment has been concluded, the present invention is not limited to the above-described constructions or shapes according to the present embodiment. For example, in the present embodiment, although round bars are used for the guide bars 20a and 20b in consideration of processability and smooth movement, a flat board may be used instead.

Moreover, in the present embodiment, although the hold member 19 and guide bars 20a and 20b are formed separately, and are combined together in a body, a hold member of an operating portion may be integrally provided to a guide bar having a flat board shape.

Moreover, since the relative position of the screw portion 17a of the operating portion 17 with respect to the base portion 22 may be movable, it is sufficient that a long hole extending in up and down direction is formed on the hold member 19, and the screw portion 17a movably inserted into the long hole. In this case, the hold member 19 may be fixed to the base portion 22. With constructing in this manner, only the operating portion 17 becomes movable along up and down direction of the hold member 19, so that the relative position between the screw portion 17a of the operating portion 17 and the base portion 22 can be adjusted.

Moreover, in the present embodiment, although the screw portion 24 for attaching a tripod is provided under the base portion 22, even if it is provided under the case 45, the effect of the present invention does not change. In this manner, the present invention may be suitably corrected or altered.

What is claimed is:

1. A tripod-connecting adapter for connecting a pair of binoculars to a tripod comprising:
   a base portion that includes a support portion and a plate portion which is supported by the support portion and extends horizontally from the support portion to have an area configured such that a pair of left and right lens barrels of the binoculars can be mounted in direct contact with left and right upper surfaces of the plate portion, respectively, and to restrict rotation of the pair of binoculars mounted on the plate portion around a joint shaft that connects the pair of lens barrels; and
   a holding device that is provided on the support portion and connectable to the joint shaft to support the pair of binoculars with the pair of lens barrels mounted in direct contact with corresponding upper surfaces of the plate portion, and to restrict movement of the pair of binoculars in an optical axis direction of the pair of binoculars.

2. The tripod-connecting adapter according to claim 1, wherein the holding device has a protruding portion protruding upward of the support portion, and a connecting member that is connected to the joint shaft is provided on the protruding portion.

3. The tripod-connecting adapter according to claim 2, wherein the holding device includes a cylindrical member that extends and is movable in a vertical direction, such that a relative position between the base portion and the connecting member is adjustable.

4. The tripod-connecting adapter according to claim 3, wherein each said upper surface supports the corresponding lens barrel from a lower side while holding the lens barrel horizontal.

5. The tripod-connecting adapter according to claim 4, wherein the connecting member fixes a position of the joint shaft when connected to the joint shaft.

6. The tripod-connecting adapter according to claim 5, wherein the support portion is provided with a hole that extends in a vertical direction, and the cylindrical member is inserted and vertically movable in the hole, and the support portion has a fixing portion that fixes a relative position between the connecting member and the base portion.

7. The tripod-connecting adapter according to claim 6, wherein the connecting member is provided integrally with the cylindrical member, and moves together with the cylindrical member thereby adjusting a position of the connecting member relative to the base portion.

8. The tripod-connecting adapter according to claim 7, wherein the fixing portion includes a clamp mechanism having a female screw that is provided on the support portion to be communicated to the hole in which the cylindrical member is inserted and a clamp screw that is screwed into the female screw;

the clamp mechanism is equipped with a clamp-operating portion removably attached to the clamp screw; and the base portion has a restricting mechanism that restricts an operating range of the clamp-operating portion attached to the clamp screw within a given range.

9. The tripod-connecting adapter according to claim 8, further comprising:

a biasing member that biases the cylindrical member in a direction such that a distance between the connecting member and the base portion narrows.

10. The tripod-connecting adapter according to claim 9, further comprising:

a resisting member that resists a biasing force of the biasing member at a position where a distance between the connecting member and the base portion becomes a predetermined distance.

11. The tripod-connecting adapter according to claim 2, wherein the base portion includes a connecting portion that connects to a tripod.

12. The tripod-connecting adapter according to claim 3, wherein the base portion includes a connecting portion that connects to a tripod.

13. The tripod-connecting adapter according to claim 4, wherein the base portion includes a connecting portion that connects to a tripod.

14. The tripod-connecting adapter according to claim 5, wherein the base portion includes a connecting portion that connects to a tripod.

15. The tripod-connecting adapter according to claim 6, wherein the base portion includes a connecting portion that connects to a tripod.

16. The tripod-connecting adapter according to claim 7, wherein the base portion includes a connecting portion that connects to a tripod.

17. The tripod-connecting adapter according to claim 1, wherein the base portion includes a connecting portion that connects to a tripod.

18. The tripod-connecting adapter according to claim 1, wherein when the holding device is connected to the joint shaft, the pair of lens barrels is held so as not to contact the holding device.

19. The tripod-connecting adapter according to claim 1, wherein when the holding device is connected to the joint shaft, the pair of lens barrels is held so as not to contact the support portion.

20. The tripod-connecting adapter according to claim 1, wherein the base portion is substantially rectangular in a plan view.

21. The tripod-connecting adapter according to claim 1, wherein when the holding device is connected to the joint shaft, the pair of lens barrels is disposed in direct contact with the corresponding upper surfaces of the plate portion, regardless of a distance between the joint shaft and the plate portion.

* * * * *